United States Patent
Kumazawa et al.

(10) Patent No.: US 8,883,069 B2
(45) Date of Patent: Nov. 11, 2014

(54) DENSE BORON CARBIDE CERAMIC AND PROCESS FOR PRODUCING THE SAME

(75) Inventors: Takeshi Kumazawa, Aichi (JP); Yoshiyuki Sensui, Aichi (JP); Toru Honda, Aichi (JP)

(73) Assignee: Mino Ceramic Co., Ltd., Gifu (JO)

( * ) Notice: Subject to any disclaimer, the term of this patent is extended or adjusted under 35 U.S.C. 154(b) by 0 days.

(21) Appl. No.: 13/407,471

(22) Filed: Feb. 28, 2012

(65) Prior Publication Data

US 2012/0157292 A1 Jun. 21, 2012

Related U.S. Application Data

(62) Division of application No. 12/664,885, filed as application No. PCT/JP2008/060964 on Jun. 16, 2008, now abandoned.

(30) Foreign Application Priority Data

Jun. 15, 2007 (JP) .................................. 2007-158332
Feb. 27, 2008 (JP) .................................. 2008-046577

(51) Int. Cl.
*C04B 35/563* (2006.01)

(52) U.S. Cl.
CPC ....... *C04B 35/563* (2013.01); *C04B 2235/6587* (2013.01); *C04B 2235/96* (2013.01); *C04B 2235/604* (2013.01); *C04B 2235/5409* (2013.01); *C04B 2235/77* (2013.01); *C04B 2235/5445* (2013.01); *C04B 2235/428* (2013.01); *C04B 2235/5436* (2013.01); *C04B 2235/614* (2013.01); *C04B 2235/3895* (2013.01); *C04B 2235/3821* (2013.01); *C04B 2235/72* (2013.01); *C04B 2235/402* (2013.01)
USPC ......................................................... 264/674

(58) Field of Classification Search
CPC ............................. C04B 35/563; C04B 35/565
USPC ................................................. 264/674, 682
See application file for complete search history.

(56) References Cited

U.S. PATENT DOCUMENTS

| | | | |
|---|---|---|---|
| 3,749,571 A | 7/1973 | Stibbs et al. | |
| 4,195,066 A | 3/1980 | Schwetz et al. | |
| 4,320,204 A | 3/1982 | Weaver | |
| 5,236,875 A * | 8/1993 | Trigg et al. | 501/89 |
| 5,720,911 A * | 2/1998 | Taylor et al. | 264/29.1 |
| 7,517,491 B2 * | 4/2009 | Speyer et al. | 264/676 |
| 7,557,054 B2 | 7/2009 | Oda et al. | |
| 2007/0001349 A1 * | 1/2007 | Muroi et al. | 264/605 |
| 2011/0070426 A1 | 3/2011 | Vanier et al. | |

FOREIGN PATENT DOCUMENTS

| | | |
|---|---|---|
| EP | 0 378 499 A1 | 7/1990 |
| JP | 47-8078 | 4/1972 |
| JP | 57-156372 A | 9/1982 |
| JP | 59-184767 | 10/1984 |
| JP | 61-291461 * | 12/1986 |
| JP | 62-12663 | 1/1987 |
| JP | 62-12664 | 1/1987 |
| JP | 8-12434 A | 1/1996 |
| JP | 2003-137655 A | 5/2003 |
| WO | 2006110720 A2 | 10/2006 |

OTHER PUBLICATIONS

English Translation of JP 61-291461.*
Namtae Cho et al.; "Densification of carbon-rich boron carbide nanopowder compacts"; J. Mater. Res., vol. 22, No. 5, May 2007; pp. 1354-1359.
Chae Hyun Lee et al.; "Pressureless sintering and related reaction phenomena of Al2O3-doped B4C"; J. Mate. Sci., vol. 27, 1992; pp. 6335-6340.
International Search Report for PCT/JP2008/060964 dated Jul. 29, 2008.
Masato Uehara et al. ; "SiC-B4C Composites for Synergistic Enhancement of Thermoelectric Property"; Journal of the European Ceramic Society; Elsevier Science Publishers, Barking, Essex, GB; vol. 24, No. 2. Jan. 1, 2004; pp. 409-412; XP004479474.
H.R. Baharvandi et al.; "Investigation on Addition of Talc on Sintering Behavior and Mechanical Properties of B4C"; Journal of Materials Engineering and Performance, ASM International, Materials Park, OH, US; vol. 15, No. 3. Jun. 1, 2006; pp. 280-283; XP001243718.
European Search Report for Application No. EP08765647 dated Mar. 21, 2011.

* cited by examiner

*Primary Examiner* — Jason L Lazorcik
*Assistant Examiner* — Russell Kemmerle, III
(74) *Attorney, Agent, or Firm* — Hamre, Schumann, Mueller & Larson, P.C.

(57) ABSTRACT

An aspect of the present invention is to provide an economical production technology for obtaining a dense boron carbide ceramic product without impairment to excellent mechanical properties, which boron carbide ceramics are inherently equipped with, by conducting heating under normal pressure without application of pressure and without needing addition of a large amount of a sintering additive to a raw material or needing any special additive or treatment. The present invention provides a production process in which, upon heating a boron carbide green body under normal pressure without application of pressure after pressing a boron carbide powder material to obtain the boron carbide green body, the boron carbide green body is heated with one of a powder, green body or sintered body, which contains at least one of aluminum and silicon, being disposed in a furnace.

15 Claims, No Drawings

DENSE BORON CARBIDE CERAMIC AND PROCESS FOR PRODUCING THE SAME

CROSS-REFERENCE TO RELATED APPLICATIONS

This application claims the priority benefit under 35 U.S.C. §120 and is a Divisional application of U.S. patent application Ser. No. 12/664,885 filed on Dec. 15, 2009 now abandoned, which was a U.S. national phase filing under 35 U.S.C. §371 of PCT Application No. PCT/JP2008/060964, filed Jun. 16, 2008, which are incorporated herein by reference and claimed priority to Japanese Patent Application No. 2007-158332, filed on Jun. 15, 2007, and Japanese Patent Application No. 2008-046577, filed on Feb. 27, 2008, the entire disclosures of which are incorporated herein, and to which priority is hereby claimed.

TECHNICAL FIELD

This invention relates to a dense boron carbide ceramic and a process for producing the same, and more specifically, a technology that can economically produce a dense boron carbide ceramic equipped with excellent mechanical properties.

BACKGROUND ART

Boron carbide ceramics can be expected to provide products having lightweight and excellent mechanical properties owing to the possession of characteristics that it exhibits extremely high hardness next to diamond and cubic boron nitride and its bulk specific gravity (density) is about two thirds or lower of that of alumina ceramics, one of typical ceramics. Boron carbide ceramics have been used over years, for example, in products such as abrasion resistant materials, e.g., wire drawing dies and blasting nozzles, and parts or components required to have high impact stress resistance. As boron carbide shows a high modulus of elasticity, its specific rigidity (the degree of its deformation per unit density) defined by its modulus of elasticity and bulk specific gravity as parameters is also high compared with not only ceramics but also carbon-based composites, and its superiority is recognized even as members that rotate at high speeds, such as steppers employed in semiconductor manufacturing equipment.

However, boron carbide is significantly inferior in sinterability as its bonds have strong covalent nature. Boron carbide has, therefore, been accompanied by the problem that good boron carbide ceramics cannot be produced economically with ease. More specifically, boron carbide is significantly inferior in sinterability even when compared with silicon carbide which is a representative carbide the sinterability of which is generally considered to be poor, and hence, it has been difficult to heat boron carbide under normal pressure without application of pressure. As a sintering method practiced upon production of high-purity boron carbide ceramics, pressure sintering such as hot pressing or gas-pressure sintering is commonly used. With such a method, however, manufacturing equipment and manufacturing cost become large, thereby failing to economically provide good boron carbide ceramic products. More specifically, the conventional pressure sintering requires pressurization equipment so that the initial cost and running cost become enormous compared with those required for pressureless sintering. Moreover, green bodies which can be heated are limited to those having simple configurations because of the application of pressure. To produce a machine part or the like of a complex configuration, for example, machining with an expensive diamond tool or the like is needed after obtaining a boron carbide ceramic of a simple configuration, and therefore, high working cost is required. It has, accordingly, been difficult to economically provide a boron carbide ceramic product of a complex configuration by conventional normal sintering. As is readily appreciated from the foregoing, the production of a boron carbide ceramic by pressure sintering is accompanied by a problem that diverse restrictions are also imposed on aspects other than equipment, to say nothing of the equipment, and technologies, which have been cultivated in normal sintering widely employed in industry, cannot be applied as they are.

Under such circumstances, it is practiced to provide a boron carbide ceramic with improved sinterability by forming it into a cermet (a composite of a ceramic and a metal). For example, it is disclosed in Patent Document 1 that a high-density and high-strength ceramic having a density of at least 85% of theoretical density can be obtained in accordance with pressureless sintering by blending a boron carbide powder, a silicon carbide powder and aluminum and heating the resultant blend into a cermet. However, the material obtained by the cermet process can hardly be considered to take advantage of the excellent properties inherent to boron carbide ceramics although it can show density and strength to some high extent.

With a view to making an improvement in sinterability, attempts have also been made to achieve densification and to make good use of the mechanical properties of boron carbide to some extent by forming boron carbide and alumina (aluminum oxide) into a composite (see Patent Document 3). However, these attempts both include a problem in that the bulk specific gravity becomes high compared with that of boron carbide alone and the inherent properties of boron carbide ceramics are impaired, because they both require as much as several percents of an additive to promote sintering so that a material higher in bulk specific gravity than boron carbide alone is added.

It was, therefore, desired to develop a normal sintering process capable of easily and economically producing a boron carbide ceramic, and a variety of proposals have been made to date. There are processes that similar to processes of obtaining silicon carbide by normal sintering, permit normal sintering by incorporating a sintering additive in a green body, and proposals have been made to date about the use of various sintering additives. There are, for example, processes that add aluminum, an aluminum alloy or an aluminum compound as a sintering additive in a raw material for a green body (see Patent Document 4), processes that add an aluminum-containing material as a sintering additive and also add an additive such as boron nitride (see Patent Document 5). It has also been proposed to obtain a dense boron carbide ceramic by using a small amount of carbon as a sintering additive and controlling a heating atmosphere with $H_2$/He (see Patent Document 6). It is proposed in Patent Document 5 to conduct sintering in a partial pressure atmosphere, which contains an aluminum-containing material as a sintering additive, by incorporating the sintering additive in a green body and further allowing the sintering additive to coexist together with the green body. In addition, there is also a proposal that obtains a dense boron carbide ceramic by coating surfaces of a boron carbide powder with carbon (see Non-patent Document 1).

Patent Document 1: JP-A-57-156372
Patent Document 2: U.S. Pat. No. 4,195,066
Patent Document 3: JP-A-47-8078
Patent Document 4: JP-A-59-184767

Patent Document 5: JP-A-8-12434
Patent Document 6: WO-A-2006/110720
Non-patent Document 1: J. Mater. Rev., 22(5) 1354-1359 (May 2007)

DISCLOSURE OF THE INVENTION

Problem to be Solved by the Invention

In the above-described conventional technologies for dense boron carbide ceramics, specific disclosures are made as will be described hereinafter. Patent Document 1 contains a description that a dense ceramic can be obtained by setting the contents of silicon carbide and metal aluminum at from 2 to 40 wt % and from 0 to 10 wt %, respectively, relative to a boron carbide content of from 60 to 98 wt %. Patent Document 2 contains a description that a dense boron carbide ceramic can be obtained by adding from 0.1 to 8 wt % of carbon in a raw material. Patent Document 3 contains a description that by incorporating from 5 to 10 wt % of aluminum or silicon as a sintering additive in a raw material, a dense boron carbide ceramic with the aluminum or silicon contained therein can be obtained without substantially loosing the aluminum or silicon as vapor. Patent Document 4 discloses that a high-strength and high-density ceramic can be obtained by adding from 1 to 10 wt % of a sintering additive such as an aluminum compound to a boron carbide powder and conducting sintering such that the sintering additive remaining in the ceramic is controlled to 0.2 wt % or lower. Patent Document 5 discloses that a ceramic having a high relative density can be obtained by adding 20% or less of an aluminum-containing material and from 0.1 to 50% of an additive such as boron nitride to a boron carbide powder and preparing a green body, and further allowing the aluminum-containing material to coexist to provide an atmosphere that contains the sintering additive. Patent Document 6 discloses that a dense boron carbide ceramic can be obtained by causing a hydrogen/helium mixed gas to flow at from 1,100 to 1,400° C. Further, Non-patent Document 1 contains a description to the effect that coating of a boron carbide powder at surfaces thereof with carbon makes it possible to obtain a dense boron carbide ceramic with addition of a small amount of carbon.

However, the boron carbide ceramics described in Patent Documents 1 and 3 are composite materials as described above, and therefore, are accompanied by a problem that inherent excellent properties (for example, modulus of elasticity) of boron carbide ceramics are impaired. The ceramics described in the remaining ones of the documents have the inherent properties of boron carbide but requires uniform incorporation of an additive such as a sintering additive at the stage of a raw material powder, difficult control of sintering conditions or use of a highly hazardous gas (for example, hydrogen in Patent document 6), and therefore, involve many industrial problems to be solved for their practice as simple, stable and economical technologies. Further, a boron carbide ceramic is an extremely brittle material, and hence, requires high toughening for its application in a broader range of industrial fields. There is a high possibility that this requirement may become a restriction to the application of conventional high-toughening technologies to the processes described in the patent documents. For these reasons, it is the current circumstance that with respect to normal sintering for the production of a boron carbide ceramic, various proposals have been conventionally made as described above but none of them have been established yet as practically usable technologies to date.

An aspect of the present invention is, therefore, to provide, an economical production technology capable of heating, without impairment to the inherent excellent properties of boron carbide ceramics, a dense boron carbide ceramic product of a complex configuration, to say nothing of one having a simple configuration, without needing addition of a large amount of a sintering additive in a raw material or needing a special additive or treatment, and moreover, under normal pressure without application of pressure. The term "dense boron carbide ceramic" as used herein means one having a relative density of 89% or higher, although from the practical viewpoint, one having a relative density of 93% or higher is desired, with one having a relative density of 94% or higher being more desired and one having a relative density of 95% or higher being particularly desired. It is to be noted that the term "relative density" means the bulk density/theoretical density.

Means for Solving the Problem

The above-described aspect can be achieved by the present invention to be described hereinafter. Specifically, the present invention provides a dense boron carbide ceramic having a relative density of 89% or higher, wherein a content of boron carbide is 96 wt % or higher, and a content of aluminum is 0.03 wt % or higher but 1.0 wt % or lower. The term "content of boron carbide" as used herein not only means an amount of boron carbide of stoichiometric composition (B:C=4:1) but also means a value that also considers a solid solution of boron carbide (a phase in which, while the crystalline structure of boron carbide is retained, the respective elements are dissolved in each other) as boron carbide because boron carbide forms the solid solution.

In another aspect of the present invention, there is also provided a dense boron carbide ceramic having a relative density of 89% or higher, wherein a content of boron carbide is 96 wt % or higher, a content of aluminum is 0.03 wt % or higher but 1.0 wt % or lower, and a content of silicon is 0.1 wt % or higher but 0.35 wt % or lower.

In a further aspect of the present invention, there is also provided a dense boron carbide ceramic having a relative density of 89% or higher, wherein a content of boron carbide is 96 wt % or higher, and a content of silicon carbide is 0.028 wt % or higher but lower than 0.5 wt %.

In a still further aspect of the present invention, there is also provided a process for producing under normal pressure a dense boron carbide ceramic having a relative density of 89% or higher, which comprises, upon heating a boron carbide green body under normal pressure without application of pressure after pressing a boron carbide powder material to obtain the boron carbide green body, heating the boron carbide green body with one of a powder, green body or sintered body, which is comprised of at least one of aluminum and silicon, being disposed in a furnace. It is more preferred to constitute that upon conducting the heating, a temperature in the furnace is raised to have at least one gas, which is selected from an aluminum-containing gas, a silicon-containing carbide gas and a silicon-containing gas other than the silicon-containing carbide gas, produced from the one of the powder, green body or sintered body, which is comprised of the at least one of aluminum and silicon and is disposed in the furnace, such that the at least one gas is allowed to exist in an inert gas atmosphere inside the furnace, and then, the temperature in the furnace is raised further to conduct the heating of the boron carbide green body.

In a yet further aspect of the present invention, there is also provided a process for producing under normal pressure a dense boron carbide ceramic having a relative density of 89% or higher, which comprises, upon heating a boron carbide green body under normal pressure without application of pressure after pressing a raw material comprised of a boron carbide powder as a principal component to obtain the boron carbide green body, heating the boron carbide green body in an inert gas atmosphere with one of an aluminum-containing gas, a silicon-containing carbide gas or a silicon-containing gas other than the silicon-containing carbide gas being allowed to exist therein. It is more preferred to constitute that upon conducting the heating, a concentration of the aluminum-containing gas, the silicon-containing carbide gas or the silicon-containing gas other than the carbide gas in the inert gas atmosphere inside the furnace during the heating is $2\times10^{-6}$ g/cm$^3$ or higher but $2\times10^{-2}$ g/cm$^3$ or lower in terms of metal.

In the production processes of the present invention constituted as described above, it is preferred that the boron carbide green body to be heated under normal pressure is obtainable by pressing a boron carbide powder of 0.2 μm or greater but 2.0 μm or smaller in average particle size under a pressing pressure of 20 MPa or higher but 2,000 MPa or lower without heating or that upon obtaining the boron carbide green body, the boron carbide powder material is pressed without addition of any sintering additive to the material such that the boron carbide green body is obtained.

Advantageous Effects of the Invention

According to the present invention, it is possible to provide an economical, dense boron carbide ceramic, which shows excellent properties, without impairment to the inherent properties of boron carbide such as, for example, its extremely high hardness and lightweight properties. According to the present invention, there are provided processes for the production of a dense boron carbide ceramic, each of which can simply and stably obtain a dense boron carbide ceramic product, which shows excellent properties and have a complex configuration, to say nothing of a simple configuration, by conducting heating under normal pressure. Described specifically, according to the production processes of the present invention, dense boron carbide ceramics can be obtained without mixing a large amount of a sintering additive in a raw material or a special additive or applying a special treatment although such mixing or application has been considered to be essential in the conventional processes. As the present invention makes it possible to simply and economically provide a dense boron carbide ceramic capable of showing excellent properties (which may hereinafter be simply called "boron carbide ceramic"), an expansion is expected in the use of boron carbide ceramics which are useful industrial products. According to the present invention, conventional technologies cultivated in normal sintering can be applied as they are, so that further synergistic effects can be expected in improvements, modifications and the like of materials, thereby making it possible to expect the provision of boron carbide ceramics that show more diverse properties.

BEST MODES FOR CARRYING OUT THE INVENTION

The present invention will be described in further detail based on preferred embodiments of the present invention. With a view to obtaining, by sintering under normal pressure, high-purity boron carbide the normal sintering of which was considered to be difficult, the present inventors have conducted studies and experiments. As a result, it has been found that boron carbide is densified under normal pressure without application of pressure by conducting heating in a gas atmosphere with a specific material existing therein, leading to the completion of the present invention.

The present inventors have confirmed that boron carbide ceramics densified by the above-described technology are lightweight and show a high hardness. As a result of a detailed study about properties at microlevel on the boron carbide ceramics, the present inventors have found that a dense boron carbide ceramic densified by the above-described technology and having a relative density of 89% or higher contains 96 wt % or more of boron carbide and also that a very small amount of an aluminum compound, a very small amount of an aluminum compound and a very small amount of a silicon compound, or a very small amount of silicon carbide exists inside the ceramic.

Specifically, it has been found that in a dense boron carbide ceramic, an aluminum compound is contained in a very small amount of 0.03 wt % or more but 1.0 wt % or less in terms of its content as aluminum. It has also been found that similar advantageous effects can also be obtained when a very small amount of a silicon compound exists together with a very small amount of an aluminum compound. Specifically, it is possible to mention a case in which an aluminum compound is contained in a very small amount of 0.03 wt % or more but 1.0 wt % or less or so in terms of its aluminum content and a silicon compound is contained in a very small amount of 0.1 wt % or more but 0.35 wt % or less or so in terms of its silicon content. Similar advantageous effects can also be obtained in a case in which 0.028 wt % or more but less than 0.5 wt % of silicon carbide is contained in a boron carbide ceramic. It is to be noted that in this case, the coexistence of an aluminum compound in a very small amount also results in a dense boron carbide ceramic of more preferred properties. It has also been confirmed that in the foregoing, the boron carbide ceramic more stably shows excellent properties when the content of aluminum therein is a very small amount of from 0.03 wt % to 0.8 wt % or so, especially from 0.05 wt % to 0.5 wt % or so.

It has also been confirmed that the dense boron carbide ceramics of such forms as described above show properties such as extremely high hardness and lightweight properties and are evidently excellent in properties compared with conventional boron carbide ceramics produced by such processes as mixing a large amount of a sintering additive or mixing a special additive. It has also been ascertained that they are substantially equal in properties compared with those produced by conventional pressure sintering such as hot pressing or gas-pressure sintering that requires high initial cost and production cost.

It is not certain why the above-described dense boron carbide ceramic products according to the present invention, each of which contains the very small amount of the aluminum compound, the very small amount of the silicon carbide compound, or the very small amount of the aluminum compound and the very small to small amount of the silicon compound, show such excellent properties. To clarify the details, a still further study is needed. Nonetheless, at least the following matters can be inferred, because these products can each be readily obtained by arranging one of a powder, green body or sintered body, which contains at least aluminum or silicon, in a furnace, disposing a green body comprised of a boron carbide powder material free of any sintering additive added therein in a gas atmosphere with a gas produced from the aluminum or silicon, and conducting sintering under normal pressure without application of pressure.

Described specifically, the existence of a gaseous aluminum or aluminum compound (hereinafter called "an aluminum-containing gaseous material") in a heating atmosphere, the existence of a gaseous silicon or silicon compound (hereinafter called "a silicon-containing gaseous material") in a heating atmosphere or the existence of an aluminum-containing gaseous material and a silicon-containing gaseous material in a furnace gives a certain effect on the sintering of boron carbide grains themselves. This is considered to be one of causes of the availability of the dense boron carbide ceramic of excellent properties. Based on the facts successfully confirmed to date with respect to the mechanism that the above-mentioned gaseous material functions as a sintering additive in the course of sintering to densify a pressed boron carbide green body, the present inventors infer as will be described hereinafter. The gaseous, aluminum-containing gaseous material in the heating atmosphere reduced a surface oxide layer ($B_2O_3$), which impairs sinterability, of the boron carbide green body into $B_4C$. Further, the aluminum-containing gaseous material formed a carbide with carbon which existed in the furnace. As this compound was stable during heating, it remained up to the starting temperature of sintering. It is hence presumed that as a result, the densification of the boron carbide green body was stably conducted in a good state to provide a dense boron carbide ceramic containing 96 wt % or more of boron carbide and having a relative density of 89% or higher. It is also presumed that the silicon-containing gaseous material also acted like the aluminum-containing gaseous material and promoted sintering to successfully achieve the densification of the boron carbide green body. It is further presumed that, when the aluminum-containing gaseous material and silicon-containing gaseous material coexisted in the gaseous internal atmosphere of the furnace, the aluminum-containing gaseous material reduced the surface oxide layer of the boron carbide in a low-temperature range and the aluminum-containing gaseous material and silicon-containing gaseous material formed a carbide, promoted sintering and achieved the densification.

The dense boron carbide ceramic according to the present invention, which has the above-described excellent properties, can be simply, stably and economically obtained by the below-described production process according to the present invention. The characteristics of the production process according to the present invention basically resides in the constitution that one of a powder, a green body and a sintered body, which contains at least aluminum or silicon, is disposed in a furnace in which a boron carbide green body pressed from a boron carbide powder material is to be heated, and in this state, the boron carbide green body is heated under normal pressure without application of pressure. The dense boron carbide ceramic having the above-described excellent properties can also be obtained likewise when as the powder, green body or sintered body to be disposed in the furnace in the foregoing, one containing at least aluminum and silicon is used. A description will hereinafter be described about the materials to be used in this production process of the present invention.

As the boron carbide powder material to be pressed into the boron carbide green body for use in the production process according to the present invention, any boron carbide powder material can be used insofar as it is one available on the market and having high purity. It is preferred to use a powder having an average particle size, for example, in a range of from 0.2 to 2.0 μm, particularly from 0.2 to 1.6 μm. Use of one having an average particle size smaller than the above-described range is not preferred because the room temperature oxidation of boron carbide itself rapidly proceeds. An average particle size greater than the above-described range, on the other hand, tends to lead to inferior pressing performance upon pressing the green body and also to a difficulty in obtaining a densified boron carbide ceramic of a higher relative density even by the production process according to the present invention. The term "average particle size" as used herein indicates the mean of a distribution obtained by a method that permits a readily measurement by centrifugal sedimentation or laser scattering particle size distribution analysis. A possibility is hence conceivable that different values may be obtained depending on whether the shapes of particles themselves are spherical or columnar. The expression "boron carbide powder material having an average particle size of from 0.2 to 2.0 μm" as described above, therefore, does not mean a raw material having a specific particle size distribution, but means a fine powder of boron carbide starting material that has been conventionally used in the production of general engineering ceramics. The use of such a fine boron carbide powder in the production process according to the present invention makes it possible to more stably obtain a good dense boron carbide ceramic under normal pressure.

A description will next be made about the powder, green body or sintered body containing at least aluminum, the powder, green body or sintered body containing at least silicon, or the powder, green body or sintered body containing at least aluminum and silicon, which is employed upon heating in the production process according to the present invention. No particular limitation is imposed on the purity of the aluminum and/or silicon contained in the powder, green body or sintered body, but use of one having a low impurity content, for example, having a purity of 90% or higher, particularly a purity of 95% or higher is preferred. In the case of the powder, it can be placed in a crucible and disposed in the furnace. In the case of the green body or sintered body, on the other hand, it is possible to use one prepared by using the powder material and having a desired configuration such as a block, porous body or annular body. Concerning aluminum and silicon, on the other hand, the use of a compound containing both of these metals can provide a better boron carbide ceramic than the use of one of these metals. For example, an alloy of aluminum and silicon can be used. In this case, it is also preferred to use one having high purity. The existence of an impurity affects the evaporation temperatures of the respective metals, and therefore, may impair the sintering through its reaction with boron carbide. It is, therefore, preferred to use one having particularly high purity. It is preferred to use these metals as carbides or nitrides, because the dense boron carbide ceramic can be stably obtained. No particular limitation is imposed on the amounts of these metals, but the dense boron carbide ceramic according to the present invention can be produced more stably with a better yield when the gas concentrations of an aluminum-containing gaseous material and/or a silicon-containing gaseous material in an inert gas atmosphere inside a heating furnace are each controlled at $2\times10^{-6}$ g/cm$^3$ or higher but $2\times10^{-2}$ g/cm$^3$ or lower in terms of metal.

To facilitate the understanding of details of the present invention, a description will hereinafter be made about the course of endeavors which have led to the production processes of the present invention and also about requirements for the successful production of a better dense boron carbide ceramic although the description overlaps with the above-mentioned matters. In the course of an study for the development of a simple production process that can afford a dense boron carbide ceramic composed of boron carbide alone by normal sintering without mixing a large amount of a sintering additive or an additive and without needing a special treatment, the present inventors made a finding as will be described below. Namely, it was found that the production of a dense boron carbide ceramic, which had conventionally been by no means obtainable by simple normal sintering, becomes feasible when the heating of a green body comprised of a boron carbide powder is conducted without application of pressure in a furnace in which gaseous silicon and/or a silicon-containing carbide gas has been produced to forcedly add the silicon gas and/or the silicon-containing carbide gas in an atmosphere gas. It is to be noted that the term "silicon-containing gas" (silicon-containing gaseous material) as used herein means a compound produced by heating metal silicon or a silicon-containing compound such as silicon carbide or silicon oxide or a gas thereof in a furnace (in which carbon often exists on its walls or the like), a gas of such a compound, or a gaseous material produced by a reaction in which one of such compound and gases took part. Examples include gaseous Si, SiC, $Si_2C$ and the like.

Based on the above-described finding, the present inventors conducted a more detailed study. As a result, it was found that the following two matters are needed as conditions for stably obtaining a dense sintered body under normal pressure from a material composed of boron carbide alone. It was confirmed as a first condition to forcedly add a silicon gas and/or a silicon-containing carbide gas in an atmosphere of an inert gas such as argon upon conducting usual normal sintering and as a second condition to conduct heating with a green body, which is comprised of a boron carbide powder as a principal component and has been obtained by pressing, being disposed in the atmosphere gas. When heating is conducted with the pressed green body being maintained in contact with the atmosphere, which contains the silicon gas and/or the silicon-containing carbide gas, in the furnace as described above, the resulting sintered body is, in spite of normal pressure, a good dense boron carbide ceramic without needing various additives in the raw material or a special treatment. As a result of a still further study, it was also found effective for the stable provision of a more densified ceramic to allow gaseous aluminum to exist in an atmosphere gas. Described specifically, the gaseous aluminum or aluminum compound (aluminum-containing gaseous material) is produced at a lower temperature than the silicon-containing gaseous material, and therefore, can more effectively promote sintering and can more readily densify a boron carbide green body. According to the study by the present inventors, this gaseous material not only increases the rate of densification but also can be expected to impart different properties to the resulting ceramic depending on which one of the aluminum-containing gaseous material, the silicon-containing gaseous material, and the aluminum-containing gaseous material and silicon-containing gaseous material exists.

Any method can be used to forcedly add the gaseous material in the inert gas atmosphere inside the furnace. For example, by disposing metal aluminum or metal silicon or a compound containing such a metal in the furnace and raising the temperature in the furnace, an aluminum-containing gaseous material or silicon-containing gaseous material can be easily produced, and as a result, the gas is allowed to exist in the inert gas atmosphere inside the furnace. Examples of the material for use in the above-described method include metal aluminum, metal silicon, aluminum oxide, silicon oxide, silicon carbide, aluminum nitride, silicon nitride, and the like. Although many kinds of materials can each produce the above-described gaseous material, it is preferred to make a selection in view of effects on the environment, the body, and the production equipment. Among these, it is preferred to use a metal or carbide. When a metal or carbide is used, it is preferred to heat it by using a graphite crucible or the like and disposing in a furnace in which carbon exists. The advantageous effects of the present invention can also be obtained when a nitride is disposed in a furnace and a green body comprised of a boron carbide powder is heated in an atmosphere gas formed by gasifying the nitride. This case, however, involves such a problem as will be described below. For example, silicon nitride decomposes to form silicon and nitrogen, and in a system that carbon exists in a furnace, the silicon promptly reacts into the carbide to form a silicon-containing gas. However, its decomposition rate is fast, thereby making it difficult to set the conditions. The disposition of such a nitride is, therefore, accompanied by a problem from the standpoint of enabling more stable production. The above-mentioned advantageous effects can also be obtained even by a process that introduces such a gaseous material from the outside of a furnace. This process is, however, accompanied by the below-described problem. As an aluminum- or silicon-containing gaseous material exhibits high corrosiveness to a chloride or the like at room temperature, the production of such an aluminum- or silicon-containing gaseous material requires additional arrangement of heating equipment or the like, and therefore, is disadvantageous from the standpoint of equipment. In the production process according to the present invention, on the other hand, the primary aspect of the present invention, that is, the provision of a boron carbide ceramic densified under normal pressure can be achieved by the extremely simple process that disposes a starting material for a gaseous material together with a boron carbide green body in a furnace as mentioned above.

To conduct the normal sintering of the green body with the gas atmosphere in the furnace being controlled in a state suited for the present invention by the disposition of the above-mentioned material in the furnace, it is preferred to conduct the sintering as will be described hereinafter. Specifically, it is preferred to conduct the sintering by disposing the above-mentioned material out of contact with the boron carbide green body to be densified, heating the material to have a gas produced from the material such that the gaseous material from the material is allowed to exist in the inert gas atmosphere inside the furnace, and then raising the temperature in the furnace to heat the boron carbide green body.

No particularly high correlation was observed between the concentration of the gaseous material in the inert gas atmosphere inside the furnace during heating as successfully realized by such a method as described above and the degree of sintering of boron carbide. As mentioned above, what is important in the present invention is to forcedly add the gaseous material from the above-mentioned material into the inert gas atmosphere inside the furnace upon conducting usual normal sintering and to heat under the resulting environment the green body obtained by pressing the material comprised of the boron carbide powder as the principal component. Therefore, the concentration value of the gaseous material forcedly added in the atmosphere gas does not sensitively affect the degree of sintering of the resulting boron carbide ceramic. However, a gas amount that is considered to be appropriate is believed to exist because, when the above-mentioned material was allowed to excessively coexist, a great deal of deposit was observed on the surface of the resultant boron carbide ceramic. It is, however, to be noted that accurate control of the concentration of the gaseous material existing in the furnace in the heating step is difficult because the inside of the furnace is under high-temperature conditions. When the addition of a silicon gas or a silicon-containing carbide gas in an atmosphere is conducted by the method that disposes metal silicon or a silicon compound in a furnace and gasifies it, for example, the charged amount of the gas source per unit volume inside the furnace can be easily determined because the metal silicon or the silicon compound disposed in the furnace is considered to be gasified wholly or partly. As a result of determination of the concentration of a gas such as a silicon gas in a furnace during heating from such a standpoint as mentioned above, it has been found that the concentration of, for example, a silicon gas in an inert gas atmosphere inside the furnace during heating can be $2 \times 10^{-6}$ g/cm$^3$ or higher but $2 \times 10^{-2}$ g/cm$^3$ or lower. According to the study by the present inventors, a good dense boron carbide ceramic can be stably obtained provided that the environment contains approximately $1 \times 10^{-3}$ g/cm$^3$ or so, in terms of a gas concentration determined as described above, of the above-described gaseous material in an atmosphere inside a furnace.

As a result of a yet further study, the advantageous effects of the present invention have been found to become available especially pronouncedly when the present invention constituted as will be described hereinafter in addition to the above-described constitution. Although, as a green body that is a target of normal sintering, one obtained by pressing a raw material comprised of a boron carbide powder as a principal component is used, a small amount of a sintering additive may be added in the raw material. It is, however, not essential to add such a sintering additive. To more stably obtain the advantageous effects of the present invention, the forming conditions for the boron carbide green body become important. Namely, the boron carbide green body may preferably be one obtained by using as a boron carbide powder material one of a particular particle size range and pressing it without heating under a pressure in a specific range. Described specifically, it is preferred to use, as a body to be heated, a green body obtained by pressing a boron carbide powder of 0.2 μm or greater but 2.0 μm or smaller in average particle size without heating under a pressing pressure of 20 MPa or higher but 2,000 MPa or lower. According to the study by the present inventors, the use of a green body, which is obtainable by using a boron carbide powder material of from 0.2 to 2.0 μm in average particle size and pressing it without heating under a pressing pressure of from 20 to 2,000 MPa, makes it possible to obtain a more densified boron carbide ceramic. It is to be noted that even with a green body pressed under a high pressure in excess of 2,000 MPa, a dense boron carbide ceramic can still be obtained. However, the bulk density of the ceramic obtained in such a case is of substantially the same level as that available from the use of a green body pressed under a low pressure of 2,000 MPa or lower. In view of equipment and the like, the pressing under a high pressure in excess of 2,000 MPa is, therefore, not considered to be an industrially reasonable condition.

As a method for controlling the internal environment of a furnace in an atmosphere that contains a gaseous material such as an aluminum-containing gaseous material or silicon-containing gaseous material at such an appropriate concentration as mentioned above, a method that allows a material such as, for example, metal aluminum, silicon or the like to coexist in the furnace and gasifies the same is simple and convenient. It is preferred to conduct this method by paying attention to the below-described matters. When metal aluminum is used, it readily melts out as its melting point is 660° C., and further, it readily turns into a gas as its vapor pressure is low. When metal silicon is used, on the other hand, it melts out during heating as its melting point is 1,410° C. under standard conditions, and further, it has a property that it is prone to a reaction with carbon. Further, silicon carbide (SiC), a representative example of silicon-containing carbides, tends to exist as a gas such as Si (metal silicon) or SiC$_2$ or Si$_2$C (silicon-containing carbide) at about 2,000° C. or higher. It is, therefore, preferred to calculate an appropriate amount of metal aluminum, metal silicon or metal aluminum and metal silicon that gives a concentration in an optimal range relative to the internal volume of the furnace when gasified, and to dispose the metal material or materials in the appropriate amount inside the furnace. In some instances, it may become necessary to restrain the fluidity of metal aluminum, which is imparted as a result of its melting, and to control the evaporation temperature by weighing adequate amounts of metal aluminum and silicon carbide. It is also preferred to set the interior of the furnace at a temperature where a silicon gas is produced from metal silicon or at a temperature where a gas is produced from a silicon-containing carbide, and then to raise the internal temperature of the furnace to a heating temperature to conduct heating.

Examples

As to whether or not the kind of a boron carbide material and the conditions for the preparation of boron carbide green bodies would affect the densification of boron carbide ceramics, a study was conducted. Effects of the heating atmosphere gas and the additives to boron carbide materials on the densification of boron carbide green bodies were also studied.

Study on the Particle Size of Boron Carbide Powder Material

Firstly, commercially-available, boron carbide powder materials, which had a boron carbide content of 98.5 wt % and were different from one another in average particle size, were provided as boron carbide raw materials. The average particle sizes of the respective raw materials were A: 0.15 μm, B: 0.2 μm, C: 0.8 μm, D: 1.6 μm, E: 2.0 μm, and F: 3.0 μm. Using those boron carbide powder materials, pressing was then conducted under a pressing pressure of 300 MPa at room temperature to obtain boron carbide green bodies, respectively. The thus-obtained green bodies were placed in graphite crucibles (internal volume: 628 cm$^3$), respectively, and in order to have a silicon-containing gaseous material produced, metal silicon was disposed as much as 10 g (calculated concentration: 0.016 g/cm$^3$) in each crucible such that the metal silicon would remain out of contact with the corresponding green body. In argon gas atmospheres with the green bodies being disposed in the above-described state, heating was conducted at 2,200° C. for 2 hours to afford boron carbide ceramics A to F.

Concerning the thus-afforded, respective boron carbide ceramics A to F, the contents of boron carbide and the results of determination of relative densities by conducting measurements pursuant to JIS-R1634 are presented in Table 1. As a result, it was confirmed that the degree of densification of a boron carbide ceramic to be afforded differs depending on the particle size of a powder raw material. It was also confirmed that a denser boron carbide ceramic of higher relative density can be afforded when a boron carbide powder material having an average particle size of from 0.2 μm to 2.0 μm, preferably an average particle size of from 0.5 μm to 1.6 μm, more preferably an average particle size of from 0.8 μm to 1.0 μm is used. As a result of measurements of the contents of boron carbide in the resultant ceramics, they were found to be 0.028 wt % or higher but lower than 0.5 wt %.

TABLE 1

Relationship between Particle Sizes of Pressing Raw Materials and Relative Densities of Respective Ceramics

| Sample designation | Average particle size (μm) | Content of boron carbide (wt %) | Relative density (%) |
|---|---|---|---|
| A | 0.15 | 98.5 | 87.9 |
| B | 0.2 | 98.5 | 93.8 |
| C | 0.8 | 98.5 | 95.9 |
| D | 1.6 | 98.5 | 94.0 |
| E | 2.0 | 98.5 | 91.6 |
| F | 3.0 | 98.5 | 88.1 |

For the sake of comparison, a heating experiment was conducted with no metal silicon being disposed in a furnace. Described specifically, green bodies prepared under the same conditions as described above and composed of the high-purity boron carbide powders were firstly placed in similar crucibles as those employed above, and were heated, as they were, under the same conditions as described above. Even in the case of the most-densified boron carbide ceramic afforded by heating the green body prepared with the boron carbide powder material C of 0.8 μm in average particle size among the thus-afforded boron carbide ceramics, the bulk specific gravity was 1.95 (relative density: 77.4%). It is to be noted that the content of boron carbide in that ceramic was 98.2 wt %. The boron carbide ceramics, which were afforded by heating the green bodies prepared with the boron carbide powder materials of the other average particles, respectively, were all 1.80 or lower in bulk specific gravity, and were not dense.

Study on the Pressing Pressure for the Preparation of Boron Carbide Green Body As a result of the study conducted above on the particle size of boron carbide raw material, the high-purity boron carbide powder C (average particle size: 0.8 μm) from which the most-densified boron carbide ceramic C was afforded was provided. Using that boron carbide powder material, pressing of boron carbide green bodies of a similar configuration was conducted at room temperature by setting the pressing pressure at 10 MPa, 20 MPa, 50 MPa, 200 MPa, 500 MPa, 2,000 MPa and 3,000 MPa, respectively. In an argon gas atmosphere with an aluminum-containing gaseous material and silicon-containing gaseous material added therein by disposing a metal aluminum powder and a metal silicon powder in a furnace such that they would remain out of contact with the respective boron carbide green bodies obtained under the corresponding pressing conditions, a temperature of 2,150° C. was held for 4 hours to conduct heating so that boron carbide ceramics G to M were afforded, respectively.

Concerning the thus-afforded, respective boron carbide ceramics G to M, the contents of boron carbide and the results of determination of relative densities by conducting measurements pursuant to JIS-R1634 are presented in Table 2. As a result, it was confirmed that the degree of densification of a boron carbide ceramic to be afforded differs depending on the pressing pressure for the preparation of its corresponding boron carbide green body. Namely, it was confirmed that the bulk density of a boron carbide ceramic to be afforded shows a tendency of an increase as its corresponding pressing pressure rises. Described specifically, it was confirmed that a denser boron carbide ceramic of high relative density can be afforded when a green body of a boron carbide powder as pressed at a pressing pressure of from 20 MPa to 2,000 MPa, preferably 100 MPa or higher, more preferably 200 MPa or higher, still more preferably 500 MPa or higher is used. It was also confirmed that the degree of densification does not change much even when pressed at a high pressure in excess of 2,000 MPa.

TABLE 2

Relationship between Pressing Pressures for Green Bodies and Relative of Respective Ceramics

| Sample designation | Pressing pressure (MPa) | Content of boron carbide (wt %) | Relative density (%) |
|---|---|---|---|
| G | 10 | 98.5 | 88.6 |
| H | 20 | 98.5 | 92.3 |
| I | 50 | 98.5 | 93.8 |
| J | 200 | 98.5 | 95.6 |
| K | 500 | 98.5 | 96.0 |
| L | 2,000 | 98.5 | 96.2 |
| M | 3,000 | 98.5 | 96.2 |

Study on the Purity of Boron Carbide Powder Material

Commercially-available powders, the boron carbide contents of which were different from one another, were filled in molds of 25 mm in diameter, and by pressing at 100 MPa, boron carbide green bodies were prepared. The used boron carbide powders all had an average particle size of 0.8 μm. The contents of boron carbide in the powders were determined by identifying crystal layers by X-ray diffractometry and practicing a quantification method. In an argon gas atmosphere with a metal aluminum being disposed in a furnace such that it would remain out of contact with the thus-obtained, respective boron carbide green bodies, a temperature of 2,150° C. was held for 4 hours to conduct heating so that boron carbide ceramics N to R were afforded, respectively. As a result of measurements of the contents of aluminum in the resultant ceramics, they were all found to be 0.09 wt %. Pursuant to JIS-R1634, the densities of the respective boron carbide ceramics were measured, and their relative densities were determined. The results are presented in Table 3. As a result, it was confirmed that the use of a boron carbide powder material having high purity leads to a denser boron carbide ceramic of higher relative density. In particular, it was confirmed that the use of a boron carbide powder material having a boron carbide content of higher than 96.0 wt % is preferred, with from 98.0 to 99.5 wt % being more preferred, and that, when industrial applicability is taken into consideration, the use of a boron carbide powder material having a boron carbide content of from 98.0 to 99.0 wt % is desired.

TABLE 3

Relationship between Purities of Raw Materials and Relative Densities of Respective Ceramics

| Sample designation | Content of boron carbide (wt %) | Relative density (%) |
|---|---|---|
| N | 94.0 | 88.2 |
| O | 96.0 | 92.8 |
| P | 98.0 | 94.4 |
| Q | 99.0 | 96.2 |
| R | 99.5 | 96.5 |

Study on Heating Atmosphere Gas

As a result of the study conducted above on the boron carbide raw material, the high-purity boron carbide powder C (average particle size: 0.8 μm) from which the most-densified ceramic was successfully afforded was provided. The powder was pressed under a pressing pressure of 100 MPa to obtain boron carbide green bodies. The thus-obtained green bodies were placed in two graphite crucibles, respectively, and in order to have a silicon-containing gaseous material produced in the crucibles, metal silicon was disposed as much as 10 g and 15 g, respectively, in the crucibles such that it would remain out of contact with the green bodies. The calculated concentrations of the silicon-containing gaseous material at that time were 0.0159 g/cm$^3$ and 0.023 g/cm$^3$, respectively. In argon gas atmospheres formed as described above, the above-described boron carbide green bodies were heated under conditions of 2,220° C. and 4 hours to afford boron carbide ceramics, respectively.

As the bulk specific gravities of the thus-afforded boron carbide ceramics, the boron carbide ceramic afforded by disposing 10 g of metal silicon had a bulk specific gravity of 2.41 (relative density: 95.6%) while the boron carbide ceramic afforded by disposing 15 g of metal silicon had a bulk specific gravity of 2.28 (relative density: 90.5%). This indicates that the degree of densification is also affected by the concentration of a silicon-containing gaseous material to be incorporated in a gas atmosphere. However, the amount of a gas to be produced significantly depends on the heating temperature, and a graphite crucible as a container and metal silicon are expected to undergo a reaction. It is, therefore, difficult to accurately measure the concentration of a carbide gas produced as a silicon-containing gaseous material.

Silicon was caused to evaporate in a crucible such that the crucible containing silicon vaporized in an amount of 0.001 g (concentration of a silicon-containing gaseous material as calculated from a weight increase of the crucible: $1.6 \times 10^{-6}$ g/cm$^3$) was provided. Using the crucible, a boron carbide green body similar to that used in the above was placed in the crucible, and heating was conducted under the same conditions as described above. As a result, the bulk specific gravity of the resultant boron carbide ceramic was 2.34 (relative density: 92.9%). This indicates that a silicon-containing gaseous material in a heating gas atmosphere contributes to the densification of boron carbide even when its concentration is low.

EXAMPLES AND COMPARATIVE EXAMPLES

Examples 1-8 and Comparative Examples 1 & 2

A commercially-available boron carbide powder (Grade: HS, product of H.C. Starck Ltd.) was filled in molds of 25 mm in diameter, and was pressed under 100 MPa to prepare green bodies. The used boron carbide powder had an average particle size of 0.8 μm and a boron carbide content of 99% (excluding 1.2% oxygen content and 0.2% nitrogen content). The green bodies obtained as described above were heated under the heating conditions varied as presented in Table 4, respectively, to afford Invention Products 1 to 8 and Comparative Products 1 and 2.

TABLE 4

Items to Be Heated and Heating Conditions

| | Items disposed and heated in furnace | Heating conditions |
|---|---|---|
| Invention products | | |
| 1 | Boron carbide green body + aluminum | Held at 2,150° C. for 2 hours in argon |
| 2 | Boron carbide green body + aluminum + silicon powder | Held at 2,266° C. for 2 hours in argon |
| 3 | Boron carbide green body + AlN green body | Held at 2,266° C. for 2 hours in argon |
| 4 | Boron carbide green body + AlN sintered body + SiC sintered body | Held at 2,266° C. for 2 hours in argon |
| 5 | Boron carbide green body + aluminum powder ($2 \times 10^{-6}$ g/cm$^3$ in crucible) | Held at 2,254° C. for 2 hours in argon |
| 6 | Boron carbide green body + aluminum + silicone powder ($2 \times 10^{-2}$ g/cm$^3$ in crucible) | Held at 2,285° C. for 4 hours in argon |
| 7 | Boron carbide green body + aluminum + silicon powder ($5 \times 10^{-2}$ g/cm$^3$ in crucible) | Held at 2,266° C. for 2 hours in argon |
| 8 | Boron carbide green body + AlN sintered body + SiC sintered body ($5 \times 10^{-4}$ g/cm$^3$ in crucible) | Held at 2,285° C. for 4 hours in argon |
| Comp. Prods. | | |
| 1 | Boron carbide green body | Held at 2,285° C. for 4 hours in argon |
| 2 | Boron carbide (with carbon added therein) green body | Held at 2,150° C. for 8 hours in argon |

Invention Products 1 to 8 and Comparative Products 1 and 2 afforded as described above were dissolved with an analytical etchant under pressure, and the contents of aluminum and silicon contained in the ceramics were measured. The measurements of those contents were conducted by plasma emission spectrometry. The densities of the respective ceramics were measured pursuant to JIS-R1634, and in Table 2, the values obtained by dividing the densities with the theoretical density 2.52 g/cm$^3$ of boron carbide are presented as relative densities in Table 2. Further, the appearance of a surface of each product was visually observed, and was evaluated in accordance with the below-described standards. The results of those measurements and evaluations are presented together in Table 5.

Evaluation Standards

Good: Appearance of such a level that surface roughness appearance as a result of shrinkage is observed.

Slightly better: Appearance of such a level that slight ruggedness is observed on the surface together with surface roughness as a result of shrinkage.

Bubbled surface: Ruggedness appeared to have been caused by an elevation as a result of bubbling from the inside is observed on the surface.

Poor: Surface roughness has become significantly greater, and fused parts are observed locally.

TABLE 5

Evaluation Results

| Sample designation | | Contents of Al and Si Components | (wt %) | Content of boron carbide (wt %) | Relative density (%) | Appearance |
|---|---|---|---|---|---|---|
| Invention products | 1 | Al | 0.05 | 99.0 | 95.2 | Good |
| | | Si | 0.00 | 99.0 | | |
| | 2 | Al | 0.10 | 99.0 | 96.8 | Good |
| | | Si | 0.20 | 99.0 | | |
| | 3 | Al | 0.97 | 99.0 | 94.3 | Slightly better |
| | | Si | 0.00 | 99.0 | | |
| | 4 | Al | 0.23 | 99.0 | 95.1 | Good |
| | | Si | 0.25 | 99.0 | | |
| | 5 | Al | 0.03 | 99.0 | 94.9 | Slightly better |
| | | Si | 0.00 | 99.0 | | |
| | 6 | Al | 0.09 | 99.0 | 97.6 | Good |
| | | Si | 0.13 | 99.0 | | |
| | 7 | Al | 0.91 | 99.0 | 92.2 | Bubbled surface |
| | | Si | 0.34 | 99.0 | | |
| | 8 | Al | 0.04 | 99.0 | 95.9 | Good |
| | | Si | 0.22 | 99.0 | | |
| Comp. prods. | 1 | — | | 99.0 | 76.4 | Poor |
| | 2 | — | | 99.3 | 88.5 | Poor |

Using the ceramics of Invention Products 2, 3, 5, 6 and 8 and Comparative Product 2 as representative examples of Invention Products 1 to 8 and Comparative Products 1 and 2, their properties were compared. Specifically, their properties were compared by the below-described methods. Firstly, the ceramics were separately worked into bending test specimens specified in JIS-R1601 to provide test specimens. Using the test specimens, bending tests were conducted at room temperature to determine their bending strength, respectively. Next, the specimens after the bending tests were polished for mirror finish, and then, their Vickers hardness was measured based on JIS-R1610. The results of those tests are presented together in Table 6. To determine the wear resistance with respect to the ceramics as the invention products and comparative product, their wear volumes were measured by the wear testing method of JIS-R1613 while using as a counterpart material a commercially-available boron carbide ceramic produced under pressure. The results so obtained are presented together in Table 6. For the sake of comparison, properties of a commercially-available, dense boron carbide ceramic as a commercial comparative product are also presented in the table. As presented in Table 6, the boron carbide ceramics as the invention products were all confirmed to have excellent bending strength and hardness and low wear volumes, which are by no means inferior to the corresponding properties of the commercial comparative product. This indicates that the invention products were all industrially-useful, dense boron carbide ceramics.

TABLE 6

Properties of Invention Products and Comparative Products

| Specimen No. | Strength (MPa) | Hardness (Hv) | Wear volume (%) |
|---|---|---|---|
| Invention Product 2 | 420 | 2,900 | 2.1 |
| Invention Product 3 | 380 | 2,500 | 3.2 |
| Invention Product 5 | 340 | 3,000 | 3.4 |
| Invention Product 6 | 560 | 3,600 | 1.1 |
| Invention Product 8 | 490 | 3,250 | 1.4 |
| Comparative Product 2 | 180 | 1,200 | 30.5 |
| Commercial comparative product | 450 | 3,300 | 2.0 |

Study on Additive to Starting Material for Boron Carbide Green Body

Finally, a study was conducted about effects on the densification of boron carbide when an additive is incorporated in a powder raw material for a boron carbide green body.

Provided was the commercial high-purity boron carbide powder C of 0.8 μm in average particle size from which the most-densified ceramic was successfully afforded in the study described above. To portions of the powder, silicon was then added in stepwise increasing amounts ranging from 0.02 wt % to 1.0 wt % in terms of silicon carbide, respectively. The resulting mixtures were separately subjected to wet blending in ethanol to prepare raw material powders. Using the thus-obtained, respective blended raw material powders, the powders were then separately pressed under a pressing pressure of 100 MPa at room temperature to obtain green bodies, respectively. Metal aluminum was disposed in crucibles such that it would remain out of contact with the respective green bodies obtained as described above. In that state, heating was conducted at 2,250° C. for 4 hours in an argon gas atmosphere to afford boron carbide ceramics, respectively.

Concerning the thus-afforded, respective boron carbide ceramics, the contents of boron carbide were determined, and by conducting measurements pursuant to JIS-R1634, the relative densities were also determined. As a result, it was found that ceramics of 89% or higher in relative density were obtained from the blended raw material powders with silicon carbide added in a range of 0.028 wt % and higher but lower than 0.5 wt %. Further, a study was also conducted on the particle size of silicon carbide to be added. As a result, substantially the same results were obtained at 0.1 μm and greater but smaller than 3.0 μm. It was, however, confirmed that, when the average particle size of the additive increased to 3.0 μm, the relative density tended to decrease and pits through which silicon seemed to have evaporated off were observed.

INDUSTRIAL APPLICABILITY

A description will now be made about application examples of the present invention. Because dense boron carbide ceramics which exhibit excellent properties in hardness and lightweight properties can be economically provided in accordance with the present invention, the utilization of boron carbide ceramics which are useful industrial products can be expanded, and boron carbide ceramics can now find utility in various applications in which they have not been used to date for their high price. As will be mentioned below, they are particularly useful upon obtaining, for example, boron carbide ceramic products of complex configurations. According to the conventional pressure sintering, green bodies which can be heated are limited to those having simple configurations because of the application of pressure, and for the production of a machine part or component of a complex configuration, machining is performed with an expensive diamond tool or the like after obtaining a boron carbide ceramic of a simple configuration. If heating is feasible under normal pressure, heating can be conducted even for a green body of a complex configuration, thereby making it possible to omit a working step and to cut down the production cost accordingly. It is, therefore, possible to expand the utility of boron carbide ceramic products in fields where their applications have been inhibited for their high product cost. In addition, the present invention permits heating under normal pressure, thereby releasing from the restrictions imposed on equipment for pressure sintering. Therefore, a variety of technologies in the production of ceramics, which have been accumulated and cultivated over years, can be applied to products according to the present invention, so that synergistic effects and the like can be expected, for example, in materials.

What is claimed is:

1. A process for producing a dense boron carbide ceramic under normal pressure comprising:
   forming a boron carbide powder material into a carbide green body by pressing without addition of a sintering additive; and
   heating said boron carbide green body under normal pressure in a furnace in the presence of at least one material selected from aluminum and silicon, present in the furnace as at least one form selected from the group consisting of a powder, a green body, and a sintered body, which is discrete from the boron carbide green body,
   wherein said heating occurs entirely in an atmosphere of an inert gas, in which at least one gas produced from said at least one form by the heating is present, and
   wherein the heating produces boron carbide ceramic having a relative density of 89% or higher.

2. The process according to claim 1, wherein the heating step comprises:
   heating said furnace to a first temperature sufficient to produce the at least one gas produced from said at least one form,
   wherein said at least one gas is at least one as selected from the group consisting of an aluminum-containing gas, a silicon-containing carbide gas, and a silicon-containing gas other than the silicon-containing carbide gas; and
   subsequently heating said furnace to a second temperature that is higher than said first temperature.

3. The process according to claim 2, wherein a concentration of the at least one gas of the aluminum-containing gas, the silicon-containing carbide gas, and the silicon-containing gas other than the silicon-containing carbide gas, present in the inert gas in the atmosphere inside the furnace during the heating step is $2\times10^{-6}$ g/cm$^3$ or higher but $2\times10^{-2}$ g/cm$^3$ or lower as a metal content.

4. The process according to claim 2, wherein the boron carbide green body is obtained by pressing a boron carbide powder having an average particle size of 0.2 μm or greater but 2.0 μm or smaller under a pressing pressure of 20 MPa or higher but 2,000 MPa or lower, without heating.

5. The process according to claim 1, wherein the boron carbide green body is obtained by pressing a boron carbide powder having an average particle size of 0.2 μm or greater but 2.0 μm or smaller under a pressing pressure of 20 MPa or higher but 2,000 MPa or lower, without heating.

6. The process according to claim 1, wherein the at least one form present in the furnace in the heating step comprises the aluminum and the silicon.

7. The process according to claim 6, wherein the at least one gas produced from the at least one form of the powder, the green body, and the sintered body is a combination of an aluminum-containing gas and a silicon-containing gas.

8. The process according to claim 1, wherein the aluminum present in the furnace in the heating step is at least one material selected from the group consisting of metal aluminum, aluminum oxide, and aluminum nitride.

9. The process according to claim 1, wherein the silicon present in the furnace in the heating step is at least one material selected from the group consisting of metal silicon, silicon oxide, and silicon carbide.

10. A process for producing a dense boron carbide ceramic under normal pressure comprising:
    forming a boron carbide powder material into a carbide green body by pressing without addition of a sintering additive; and
    heating said boron carbide green body under normal pressure in a furnace,
    wherein said heating occurs entirely in an inert atmosphere, in which at least one gas selected from the group consisting of an aluminum-containing gas, a silicon-containing carbide gas and a silicon-containing gas other than the silicon-containing carbide gas is present, and
    wherein the heating produces boron carbide ceramic having a relative density of 89% or higher.

11. The process according to claim 10, wherein a concentration of the at least one gas of the aluminum-containing gas, the silicon-containing carbide gas, and the silicon-containing gas other than the silicon-containing carbide gas, present in the inert gas in the atmosphere inside the furnace during the heating step is $2\times10^{-6}$ g/cm$^3$ or higher but $2\times10^{-2}$ g/cm$^3$ or lower as a metal content.

12. The process according to claim 10, wherein the boron carbide green body is obtained by pressing a boron carbide powder having an average particle size of 0.2 μm or greater but 2.0 μm or smaller under a pressing pressure of 20 MPa or higher but 2,000 MPa or lower, without heating.

13. The process according to claim 10, wherein the at least one gas is a combination of the aluminum-containing gas and the silicon-containing carbide gas or a combination of the aluminum-containing gas and the silicon-containing gas other than the silicon-containing carbide gas.

14. The process according to claim 10, wherein the aluminum-containing gas is generated from least one material selected from the group consisting of metal aluminum, aluminum oxide, and aluminum nitride.

15. The process according to claim 10,
    wherein the silicon-containing carbide gas is generated from silicon carbide, and
    the silicon-containing gas other than the silicon-containing carbide gas is generated from at least one material selected from metal silicon and silicon oxide.

* * * * *